July 15, 1930.  J. W. MARTIN ET AL  1,770,415
DIRECTION SIGNAL DEVICE
Filed Nov. 20, 1928  4 Sheets-Sheet 4
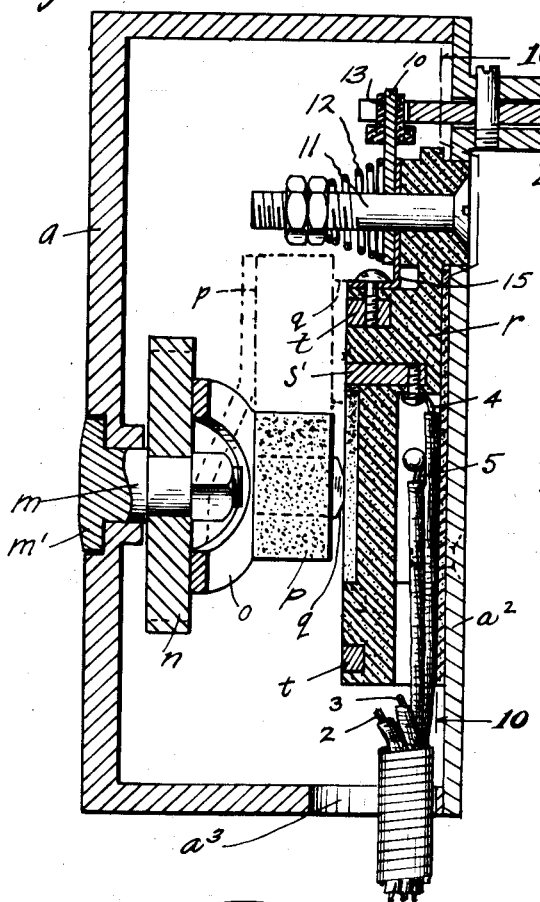
Inventors.
John Winter Martin,
Ernest William Manning,
Jess Anthony Manning
by Patented July 15, 1930

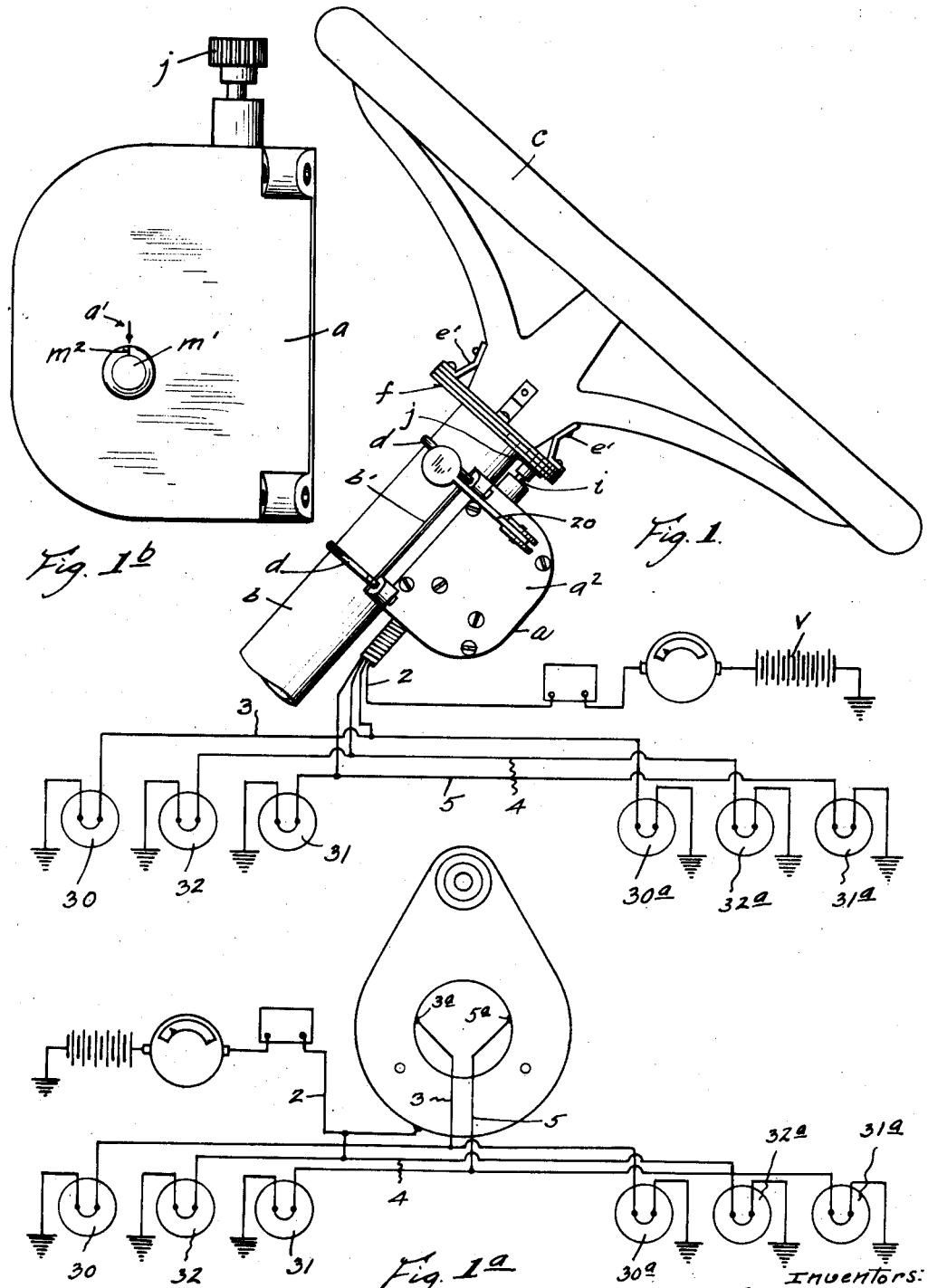

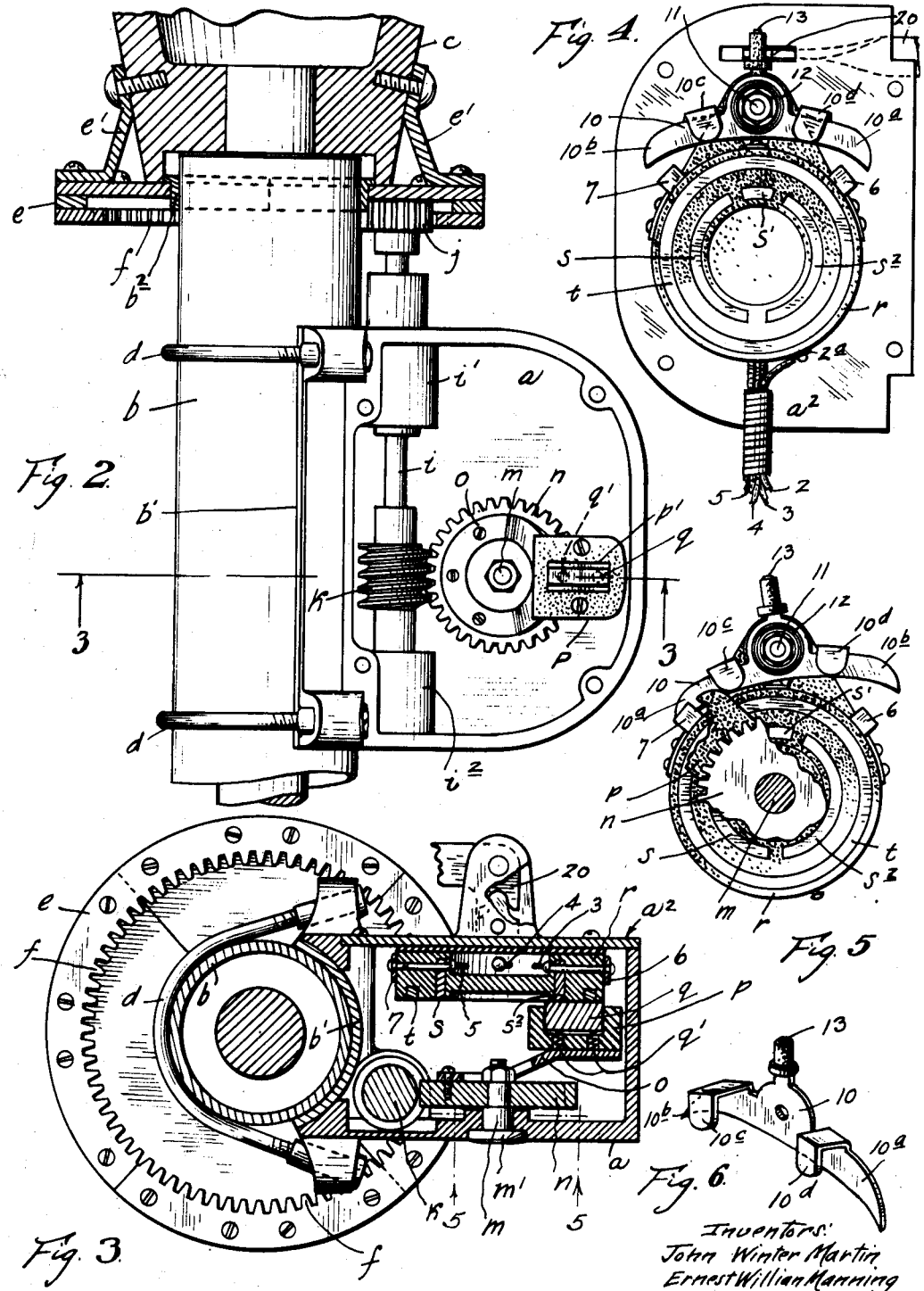

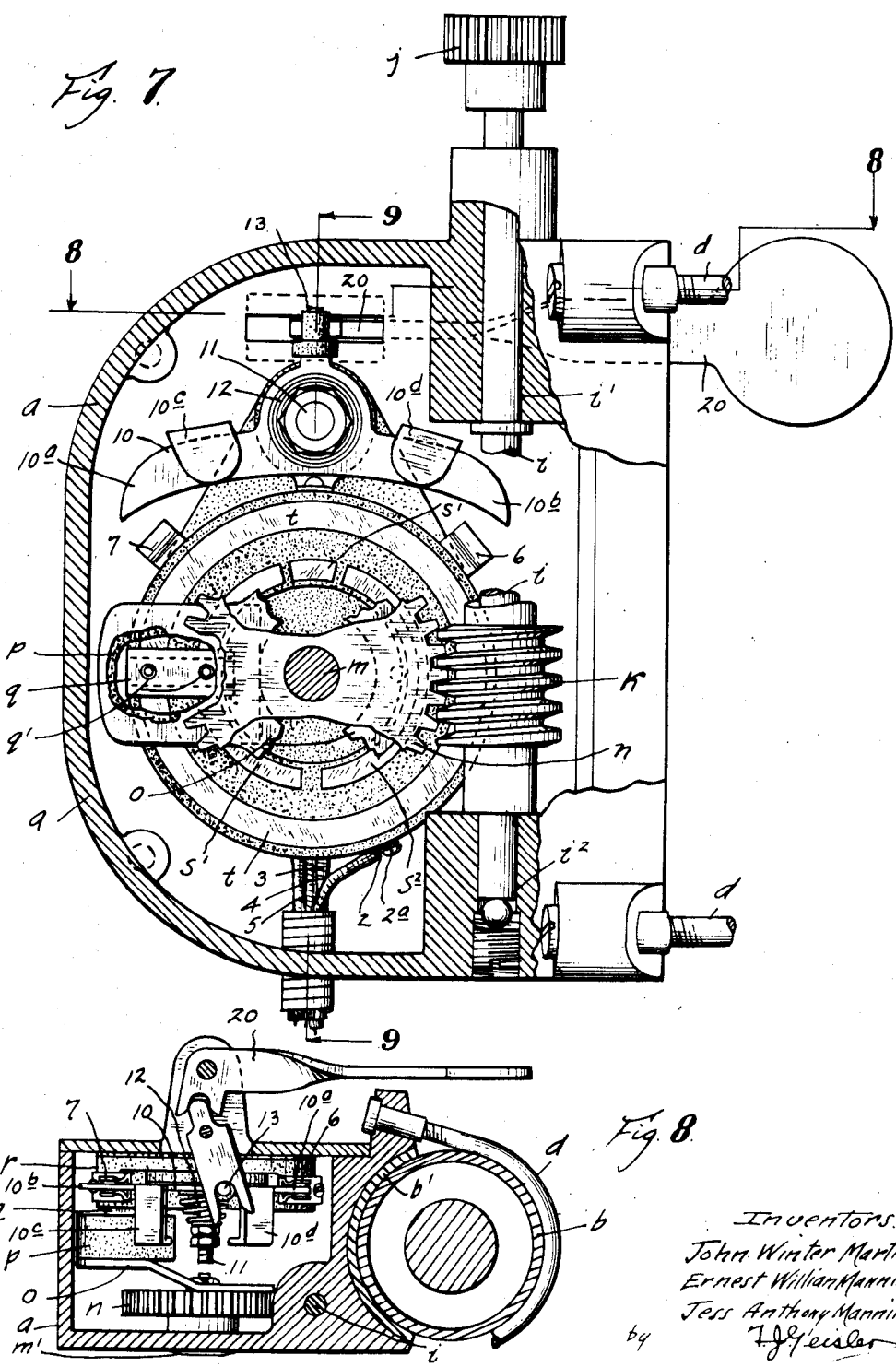

1,770,415

UNITED STATES PATENT OFFICE

JOHN WINTER MARTIN, ERNEST WILLIAN MANNING, AND JESS ANTHONY MANNING, OF PORTLAND, OREGON; SAID ERNEST WILLIAN MANNING AND SAID JESS ANTHONY MANNING ASSIGNORS TO SAID JOHN WINTER MARTIN AND HARRY WILLIAN MANNING

DIRECTION-SIGNAL DEVICE

Application filed November 20, 1928. Serial No. 320,642.

Our invention relates to the providing of illuminable electric direction signals for motor vehicles, hereinafter called the signals, thereby to indicate a change in direction of the motor vehicle sufficiently in advance of the turning point to enable the other vehicles to observe and heed such signal. Since in modern motor vehicles the steering mechanism is so geared that more than a complete revolution of the steering wheel is required to change the direction of the vehicle, it is necessary that the throwing on of the signals be arranged to permit the steering wheel to be operated for keeping the vehicle on its straight ahead course, without throwing on the direction signals since such would create confusion.

The object of our invention therefore is to provide an essentially automatic, illuminable direction signalling device adapted to indicate intended changes in direction sufficiently in advance of making the turn so that the other vehicles may have ample opportunity to heed such signal and adjust their course accordingly; in that way rendering the traffic more safe. At the same time so arranging the signal operating devices that the right or left turn signals will not be thrown on by the operation of the steering wheel for holding the vehicle to a straight ahead course; but that these signals will only be thrown on when the steering wheel is operated to the degree necessary to turn a corner, or to move the vehicle from one lane of traffic to another.

In other words, the object of our invention is to provide a dependable signalling device of the character mentioned which is adapted to permit the steering wheel to be rotated sufficiently in either direction as necessary to keep the automobile on a straight course, without throwing on said direction signals, until the steering wheel is operated to change the course of the automobile, for going into another lane of traffic or making a turn into a cross street.

A further incidental object is to provide a signal device adapted to actuate a distinctive central straight ahead signal which will serve as means for orienting the direction signal shown by its location to the central signal.

A further object is to provide a manual switch for actuating our signal device which manual control will be automatically thrown out of action or in other words, returned to neutral position by the subsequent operation by the driver of the steering wheel. By this arrangement the giving of a wrong signal by the manual switch is automatically corrected by the subsequent turning of the steering wheel in the right direction.

A further object of our invention is to provide, in an electric direction signalling device for automobiles, a switch controlling independent electric signals, the switch comprising an assembly of relatively fixed contacts to which the battery wires are connected, and an operable member constituting the brush of said contacts; the said assembly being carried by a removable section of the support of the switch; the operable-switch member being connected by operating means with the steering wheel, and said operable member and operating means being carried by the relatively fixed section of said support.

By this arrangement said assembly may be readily connected with the energizing circuit and as readily removed as a unit, without disturbing said operable switch member and the said operating connections thereof with the steering wheel.

The above mentioned, and incidental features of our invention, the details of construction and the mode of operation thereof, are hereinafter fully described with reference to the accompanying drawings.

In the drawings:

Fig. 1 shows our invention mounted on the steering wheel post of a motor vehicle, and illustrates the circuits connecting it with the illuminable electric signals carried on the front and rear of the motor vehicle;

Fig. 1ª shows the said circuits adapted for continuous illumination of a central guide signal;

Fig. 1ᵇ shows our invention in a similar view to Fig. 1, except taken from the other side and removed from the steering wheel post;

Fig. 2 shows our invention with one side of the housing or casing removed but with the body of the housing or casing attached to the steering post, and illustrates partly in section the means carried by the steering wheel for operating it;

Fig. 3 shows a section taken on the line 3—3 of Fig. 2 looking in the direction indicated by the arrows;

Fig. 4 shows in elevation a detail view of the switch elements carried by the removable side of the casing;

Fig. 5 shows a section on a plane indicated by the line 5—5 in Fig. 3, looking in the direction indicated by the arrows;

Fig. 6 shows a perspective view of the manual switch by itself;

Fig. 7 shows an enlarged fragmentary sectional elevation of our signal device by itself;

Fig. 8 shows on a reduced scale a transverse section taken on the line 8—8 of Fig. 7;

Fig. 9 shows a section taken on the line 9—9 of Fig. 7;

Fig. 10 shows a section taken on the line 10—10 of Fig. 9;

Fig. 11 shows an enlarged perspective view of the insulating mounting of the stationary switch elements; and Fig. 12 shows the contact or switch elements carried by the removable side of the casing removed from their said insulating mounting.

With reference to the figures, our invention consists of a housing or casing $a$ secured to the steering post $b$ of a motor vehicle, just below the steering wheel $c$, by means of suitable shackles $d$, with one side of the body of the casing parallel with the axis of the steering post.

A circular bushing $b^2$ is provided similarly between the ring-like member $e$ and the hub of the steering wheel $c$.

The housing or casing $a$ is adapted to fit the largest standard sizes of steering posts, but in case our signal device is to be secured to a smaller size of steering post, we provide a semi-circular bushing $b'$, as shown in Fig. 3.

The ring-like member $e$ is secured to the steering wheel as at $e'$, and is provided with internal gear teeth $f$.

A shaft or spindle $i$ is journaled in the body of said casing as at $i'$ and $i^2$, its upper end projecting through the casing and such end carries a pinion $j$ meshing with said internal gear teeth $f$. The portion of the shaft or spindle $i$ between its journal ends has a worm $k$. A stub shaft $m$ is journaled in one side of the casing body $a$ and a worm gear $n$ is carried by the said shaft, in mesh with the said worm $k$.

The outer end of the shaft $m$ is provided with a head $m'$ on which is a mark $m^2$, adapted for registration with a similar mark $a'$ on the outer surface of the casing $a$, so that the relative positions of the inclosed mechanism may be conveniently determined, see Fig. 1$^b$.

An arm $o$ is secured on the pinion end and carries a radially disposed block of insulating material $p$. A metal contact bar or switch member $q$ is loosely carried in a cavity $p'$ provided in said block $p$. See Figs. 2 and 3. Small coil springs $q'$ serve to hold the contact-piece $q$ projecting from the block (see Figs. 2 and 3), assuring contact with the contacts $t$, $s$, $s'$, $s^2$, thus compensating for looseness which may develop in the gearing. Furthermore, the switch member $q$ is tapered in cross section towards its face bearing on said contacts, as shown in Fig. 9, and such taper may be conformed relatively to the predetermined amount of movement to be permitted the switch member $q$ without making contact with either of the contacts $s$ or $s^2$. Said taper further tends to cause said bearing face to be broadened by wear, and thus compensate for any lost motion of the gearing, due to wear of its members.

Mounted on the removable side $a^2$ of the casing $a$ oppositely to the worm gear $n$ is an insulating block $r$, Figs. 10 and 11, which carries concentric contacts $t$, $s$, $s'$, $s^2$ centered to correspond with the center of the worm gear $n$, see Figs. 11 and 12. The circuit wires 2, 3, 4, 5 are connected to the said contacts as at $2^a$, $3^a$, $4^a$, and $5^a$, Fig. 10; the circuit wires being extended into the casing through the slot $a^3$ of the bottom of the casing.

The circuits 3 and 5 are also connected by means of bus bars $3^b$, and $5^b$ to the spring contacts 6 and 7, respectively, on the circumference of the blocks $r$. See Fig. 10.

A double ended knife switch 10, of which a detail is shown in Fig. 6, is pivoted at the top of the block $r$ on a bolt 11 and resistance to its pivotal movement is provided by a coil spring 12.

The spring contacts 6 and 7 are arranged on the block $r$, so as to be adjacent the respective ends $10^a$ and $10^b$ of the knife switch 10. Pendant lugs $10^c$ and $10^d$ are provided on each end of the said knife switch and the latter is connected with the circuit 2 by means of a bar 15 connecting it with the switch member or contact $t$. See Figs. 9 and 10.

A projecting insulated pin 13 is provided on the knife switch 10 and a compound manual lever 20 is pivoted on the exterior of the casing $a$ and is connected with the pin 13, so that as the lever 20 is moved manually, the knife switch 10 will be operated to open or close the signal circuits respectively.

The circuit 2 is connected to a source of electric energy $v$, and the circuit 3 is connected to the front and rear signals 30 and $30^a$ comprising incandescent bulbs and lenses of a distinctive color, and/or shape, for indicating a left turn, Fig. 1.

The circuit 5 is connected to similar signals 31, $31^a$, provided preferably with a lens of another distinctive color and/or shape arranged on the right side of the signals 30, $30^a$, looking in the direction of travel of the motor vehicle.

The circuit 4 is similarly connected to signals 32, 32ª, provided preferably with a lens different in color and/or shape from those previously described, and is located between the elements 30, 30ª, and 31, 31ª to function to orient the other signals when actuated.

To properly adjust our signal device, when it is being attached to a motor vehicle, the match mark $m^2$ on the shaft $m$ and the mark $a'$ on the side of the casing $a$ are positioned to register, in which position the switch member $q$ carried by arm $p$ will be in its intermediate position, bearing on the switch member $s'$ and throwing on the orienting signals 32, 32ª.

In the operation of our invention, which is essentially automatic,—when the motor vehicle is moving straight ahead and the arm $p$ is positioned so that switch member $q$ has contact with switch member $s'$ the circuit 4 is closed and the orienting signals 32, 32ª are thrown on as shown by broken lines in Fig. 9.

When a turn is to be made say to the left, the rotation of the steering wheel $c$ rotates the pinion $j$, on the shaft or spindle $i$, which rotates the worm gear $n$, by means of the worm $k$, and causes the switch members $q$ to be moved from the switch member or contact $s'$ to the arcuate switch member or contact $s$, thus closing the circuit 3 and illuminating the signals 30, 30ª, to indicate a left turn simultaneously breaking the circuit 4, discontinuing the guide or orienting signals 32, 32ª.

When the turn is completed and the steering wheel is rotated back to the straight ahead position, the switch member $q$ is again positioned to make contact with switch member $s'$, thus breaking the circuit 3 and again closing the circuit 4, which discontinues the left turn signal 30, 30ª, and again illuminates the signal 32, 32ª indicating a straight ahead course.

The operation of the right turn signal is similar, the contact being made by the switch member $q$ with the arcuate switch member $s^2$, closing the circuit to the right hand signals 31, 31ª.

By this construction and arrangement, none of the operations of the steering wheel necessary to hold the motor vehicle on a straight ahead course, will actuate the direction signals.

In short, the cooperating switch elements are so arranged that the movement of the steering wheel about twelve degrees, and thereby the guiding or steering groundwheels of the automobile about one degree, to either side of a straight course, will not throw on either direction signal; such permitted movement of the steering wheel being sufficient under the present generally used steering mechanism to keep the automobile on a straight course.

But the amount of such permitted movement may be increased by filing the sides of the switch member $q$, to reduce the width of its outer face; or by changing the spacings between the switch members $s$, $s'$, and $s^2$.

The described arrangement of the switch contacts or members of the signal circuits is further adapted to indicate the intention of turning the automobile some distance ahead of making the turn, as at present required by many traffic regulations.

Furthermore, the ratio of the gearing between the movement of the steering wheel and that of the arm $p$ is so arranged that the extreme rotation which may be given to the steering wheel in one direction will not move the switch member $q$ from one of the contacts $s$ or $s^2$ to the other, and thus confuse the given signals in such operation of the steering wheel.

If it is desirable to maintain the guide signals 32, 32ª in constant illumination to serve as means for orienting the direction signals, we may, as shown in Fig. 1ª, change the circuits of the guide signals 32, 32ª to connect it directly with the circuit 2 and the source of electric energy $v$; in which case the contact section $s'$, will be dead and serves merely as an inactive resting point for the contact bar $q$.

Furthermore, when it is desired to indicate manually a change in direction before the turn is actually being made, the lever 20, which is located conveniently adjacent the steering wheel, may be moved by the driver to the left to indicate a left turn or to the right to indicate a right turn. A left-hand movement of the lever 20, which is in contact with the insulated pin 13 will move the end 10ª of the knife switch 10, so as to engage the spring contact 6, see Fig. 5 and close the circuit 4 actuating the direction signals 30, 30ª.

Then as the turn is being made and the arm $o$ is moved by the rotation of the steering wheel, it strikes the lug 10ᶜ on the knife switch 10 and moves the latter from the contact 6, breaking the circuit through the knife switch, in other words placing the knife switch in neutral position, actuating neither of the direction signals, but the circuit 4 in the meantime having been closed by the arm $o$, by the operation of the steering wheel the direction signal given through the latter is not affected, but is discontinued only after the turn is completed as before described. A right turn may be indicated similarly.

As will be apparent, our signal device need not be connected directly by the steering wheel, but indirectly instead as, for example, through the steering shaft.

We claim:

1. A direction signaling device comprising a spindle, means for supporting the same on the steering post of an automobile with the spindle journaled parallel with the axis of the steering post, a pinion on said spindle, a gear adapted to mesh with said pinion, means for connecting said gear to the steering wheel, a worm on said spindle and a worm-gear meshing therewith, journaled in said supporting means and a switch adapted to be connected in the circuits of independent electric signals, said switch including concentric, relatively fixed, spaced, arcuate contacts in each signal circuit, and a rotatable switch member actuated by said worm gear, the central point between said fixed contacts coinciding with the axis of rotation of said rotatable switch member, the angular positions of said fixed switch contacts and the motion imparted to said rotatable switch member, through said worm gear being arranged relative to a predetermined amount of motion to be permitted the steering wheel without making contact betwen the rotatable switch member and either fixed contact.

2. A direction signalling device comprising a casing and means for securing the casing to the steering post of an automobile, a spindle journaled in said casing parallel with the axis of the steering post, one end of the spindle projecting beyond said casing, a pinion on said projecting end, a split gear adapted to mesh with said pinion and means for operatively connecting such gear to the steering wheel, a worm on said spindle within said casing, a worm gear journaled in the casing, in mesh with said worm, a switch adapted to be connected in the circuits of independent electric signals, including arcuate contacts, the centers of said arcuate contacts coinciding with the axis of rotation of said worm gear, and a rotatable switch member actuated by the worm gear, the angular positions of said arcuate contacts and the amount of movement imparted to said rotatable switch member from the steering wheel through said worm and gear being arranged relative to a predetermined amount of rotation to be permitted the steering wheel without energizing either direction signal.

3. A direction signaling device comprising a casing and means for securing the casing to the steering post of an automobile with a spindle journaled in said casing parallel with the axis of the steering post, one end of the spindle projecting beyond said casing, a pinion on said projecting end, a split gear adapted to mesh with said pinion and means for operatively connecting said gear to the steering wheel, a worm on said spindle within said casing, a worm gear journaled in the casing in mesh with said worm, a switch adapted to be connected in the circuits of independent electric signals, including arcuate contacts, the centers of said arcuate contacts coinciding with the axis of rotation of said worm gear, and a rotatable switch member carried by the worm gear, the angular positions of said arcuate contacts and the amount of movement imparted to said rotatable switch member from the steering wheel through said worm and gear being arranged relative to a predetermined amount of rotation to be permitted the steering wheel without energizing either direction signal.

4. A direction signalling device comprising a casing having a removable side and means for securing the body of the casing to the steering post of an automobile, a spindle journaled in the body of said casing parallel with the axis of the steering post, one end of the spindle projecting beyond said casing, a pinion on said projecting end, a split gear adapted to mesh with said pinion and means for operatively connecting such gear to the steering wheel, a worm on said spindle with said casing, a worm gear journaled in the body of said casing, in mesh with said worm, a switch adapted to be connected in the circuits of independent electric signals, including arcuate contacts, said contacts carried by the removable side of said casing, the centers of said arcuate contacts coinciding with the axis of rotation of said worm gear, and a rotatable switch member actuated by the worm gear, the angular positions of said arcuate contacts and the amount of movement imparted to said rotatable switch member from the steering wheel through said worm and gear being arranged relative to a predetermined amount of rotation to be permitted the steering wheel without energizing either direction signal.

5. A direction signaling device comprising a casing and means for securing the casing to the steering post of an automobile, a spindle journaled in said casing parallel with the axis of the steering post, one end of the spindle projecting beyond said casing, a pinion on said projecting end, a split plate having a central opening and means for securing the same to the steering wheel, said plate provided with an annular pendant flange having internal gear teeth adapted to mesh with said pinion, a worm on said spindle within said casing, a worm gear journaled in the casing, in mesh with said worm, a switch adapted to be connected in the circuits of independent electric signals, including arcuate contacts, the centers of said arcuate contacts coinciding with the axis of rotation of said worm gear, and a rotatable switch member actuated by the worm gear, the angular positions of said arcuate contacts and the amount of movement imparted to said rotatable switch member from the steering wheel through said worm and gear being arranged relative to a predetermined amount of rotation to be permitted the steering wheel without energizing either direction signal.

6. A direction signaling device comprising a casing and means for securing the casing to the steering post of an automobile, a spindle journaled in said casing parallel with the axis of the steering post, one end of the spindle projecting beyond said casing, a pinion on said projecting end, a split gear adapted to mesh with said pinion, and means for operatively connecting such gear to the steering wheel, a worm on said spindle within said casing, a worm gear journaled in the casing, in mesh with said worm, a switch adapted to be connected in the circuits of independent electric signals, including arcuate contacts, the centers of said arcuate contacts coinciding with the axis of rotation of said worm gear, and a rotatable switch member actuated by the worm gear, the angular positions of said arcuate contacts and the amount of movement imparted to said rotatable switch member from the steering wheel through said worm and gear being arranged relative to a predetermined amount of rotation to be permitted the steering wheel without energizing either direction signal, the shaft of said worm-gear extending to the exterior of the casing wall in which it is journaled and means on said shaft end and the casing wall adapted to indicate the position of said rotatable switch member relatively to said contacts.

7. In a direction signaling device for automobiles, a gear adapted to be fixed to the steering wheel concentric with its axis of rotation, a spindle, means for supporting the spindle on the steering post parallel with the axis thereof, a pinion on said spindle meshing with said gear, independent electric signals, a switch in the circuits of the latter, carried by said supporting means, said switch including relatively fixed contacts carried by a removable section of said supporting means, and a movable switch member connected by suitable gearing with said spindle, and thereby operable to close either signal circuit, the movable switch member and gearing connecting the same to the spindle being carried by a relatively fixed section of said supporting means, whereby said fixed contacts and connections are removable without disturbing said movable switch member and its connection with said spindle.

8. In a direction signaling device for automobiles, independent electric signals, and a switch controlling the circuits thereof, said switch comprising an assembly of relatively fixed contacts connected in the circuit wires of said signals and to a source of electrical energy, and an operable switch member cooperating with said contacts, a support for said switch having a removable section, said assembly of fixed contacts being carried by said removable section, means thru which said operable switch member is operably connected with the steering wheel, said operable switch-member and said operating connection thereof being carried by the relatively fixed section of said support, whereby to permit the removal of said assembly without disturbing said operable switch member and the operating means thereof.

9. In a direction signaling device for automobiles, independent electric signals, and a switch controlling the circuits thereof, said switch comprising an assembly of relatively fixed contacts connected in the circuit wires of said signals, and to a source of electrical energy, and an operable switch member cooperating with said contacts, a casing supporting said switch, said casing having a removable side, said assembly of fixed contacts being carried by said removable side, said casing closed at the bottom, the latter provided with a slot adjacent said removable side, thru which slot the circuit wires connected to said contacts extend, means by which said operable switch member is operably connected with the steering wheel, said operable switch-member and said operating connection thereof being carried by the relatively fixed side of said casing, whereby to permit the removal of said assembly without disturbing said operable switch member and the operating means thereof.

10. In a direction signaling device for automobiles comprising independent electric signals, a switch operatively connected with the steering wheel, including spaced concentric, primary, arcuate contacts in the circuits of said signals, and a rotatable switch member pivoted concentric with said contacts, an auxiliary manually rockable switch-member pivoted between said primary contacts, the latter provided with supplementary contacts so arranged that the extremities of said auxiliary switch member may make contact with either thereof, said auxiliary switch member adapted normally to be neutrally positioned with respect to said supplementary contacts, and means whereby the movement of the rotatable switch-member, thru the medium of the steering wheel, moves said manual auxiliary switch member from its active into its neutral position.

11. In a direction signaling device for automobiles comprising independent electric signals, a switch operatively connected with the steering wheel, including spaced concentric, primary, arcuate contacts in the circuits of said signals, and a rotatable switch member pivoted concentric with said contacts, an auxiliary manually rockable switch-member pivoted between said primary contacts, the latter provided with supplementary contacts so arranged that the extremities of said auxiliary switch member may make contact with either thereof, said auxiliary switch member adapted normally to be neutrally positioned with respect to said supplementary contacts, and means comprising abutments on the extremities of said auxiliary switch member located in the paths of rotation described by the free extremity of said rotatable switch member whereby the movement of the rotatable switch-member, thru the medium of the steering wheel, moves said manual auxiliary switch member from its active into its neutral position.

12. In a direction signaling device for automobiles including a switch in the circuits of independent electric direction signals, and gearing connecting the operable member of said switch with the steering wheel, said gearing including a gear mounted on the steering wheel concentric with the axis of rotation thereof, said gear comprising an internal ring-gear section and an annular section, said sections being diametrically split and removably secured one on the other with lapped joints.

13. In a direction signaling device for automobiles including a switch in the circuits of independent electric signals, and gearing connecting the operable member of said switch with the steering wheel, said gearing including a gear mounted on the steering wheel concentric with the axis of rotation thereof, said gear comprising a split plate having a central opening, and provided with an annular pendant flange having internal gear teeth, means for mounting the gear on the steering wheel of an automobile concentric with the axis thereof.

14. In a direction signaling device for automobiles, including a switch in the circuits of independent electric direction signals, and gearing connecting the operable member of said switch with the steering wheel, said gearing including a gear mounted on the steerng wheel concentric with the axis of rotation thereof, a spindle, a pinion carried by said spindle meshing with said gear, a casing in which said spindle is journalled, the body of said casing having a reentrant side adapted to bear on the steering post, thereby to position said spindle parallel with the axis of the steering post.

15. In a direction signaling device for automobiles, including a switch in the circuits of independent electric direction signals, and gearing connecting the operable member of said switch with the steering wheel, said gearing including a gear mounted on the steering wheel concentric with the axis of rotation thereof, a spindle, a pinion carried by said spindle, meshing with said gear, a casing in which said spindle is journalled, said casing provided with ears, and shackles engaging with said ears, the body of said casing having a reentrant side adapted to bear on the steering post, thereby to position said spindle parallel with the axis of the steering post.

16. In an electric direction signaling device for automobiles, a switch including an insulating disk having spaced concentric contacts in the circuits of the signals, an insulated rotatable arm whose axis of rotation coincides with the center of said contacts, a removable contact piece carried by said arm adapted to connect said contacts, resilient means adapted to hold said contact piece against said contacts, gearing connecting said arm with the steering wheel, said contact piece tapering in cross section towards its face bearing on said contacts, whereby to cause said face to be broadened by wear, and thus tending to compensate for any lost motion of the gearing due to wear of its members.

JOHN WINTER MARTIN.
ERNEST WILLIAN MANNING.
JESS ANTHONY MANNING.